United States Patent [19]

Lord et al.

[11] 4,348,799
[45] Sep. 14, 1982

[54] APPARATUS FOR INSTALLING ROLLS ON A CONVEYOR SHAFT

[75] Inventors: Tom J. Lord, Athens, Ga.; William V. Snyder, Carlisle, Pa.

[73] Assignee: PPG Industries, Inc., Pittsburgh, Pa.

[21] Appl. No.: 239,255

[22] Filed: Mar. 2, 1981

Related U.S. Application Data

[62] Division of Ser. No. 22,906, Mar. 22, 1979, Pat. No. 4,279,071.

[51] Int. Cl.³ .......................................... B23P 11/02
[52] U.S. Cl. ..................................................... 29/450
[58] Field of Search ............... 29/450, 451, 235, 717, 29/789, 797; 277/1

[56] References Cited

U.S. PATENT DOCUMENTS

| | | | |
|---|---|---|---|
| 464,093 | 12/1891 | Cartwright et al. | 29/235 UX |
| 2,008,772 | 7/1935 | Robertson | 29/235 X |
| 2,218,904 | 10/1940 | Burd | 29/235 |
| 2,658,269 | 11/1953 | Redding | 29/235 |
| 3,369,286 | 2/1968 | Marshall | 29/235 |
| 3,426,119 | 2/1969 | Chapman et al. | 264/230 |
| 3,605,239 | 9/1971 | Eschholz | 29/235 |
| 3,611,536 | 10/1971 | Guenther et al. | 29/235 |
| 3,665,578 | 5/1972 | Jaquette | 29/235 X |
| 3,686,741 | 8/1972 | Williams et al. | 29/235 X |
| 3,812,562 | 5/1974 | Lovett | 29/235 X |
| 3,827,124 | 8/1974 | Hervieux | 29/235 |
| 3,879,252 | 4/1975 | Vossen | 29/235 X |
| 4,126,927 | 11/1978 | Woodward et al. | 29/450 |

*Primary Examiner*—Charlie T. Moon
*Attorney, Agent, or Firm*—Donald Carl Lepiane

[57] ABSTRACT

A carriage for moving urethane rings along a shaft is driven by an air motor powering a rack and pinion arrangement.

1 Claim, 5 Drawing Figures

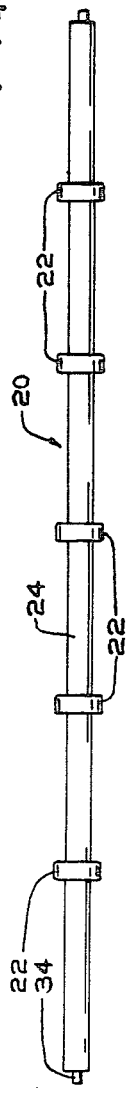
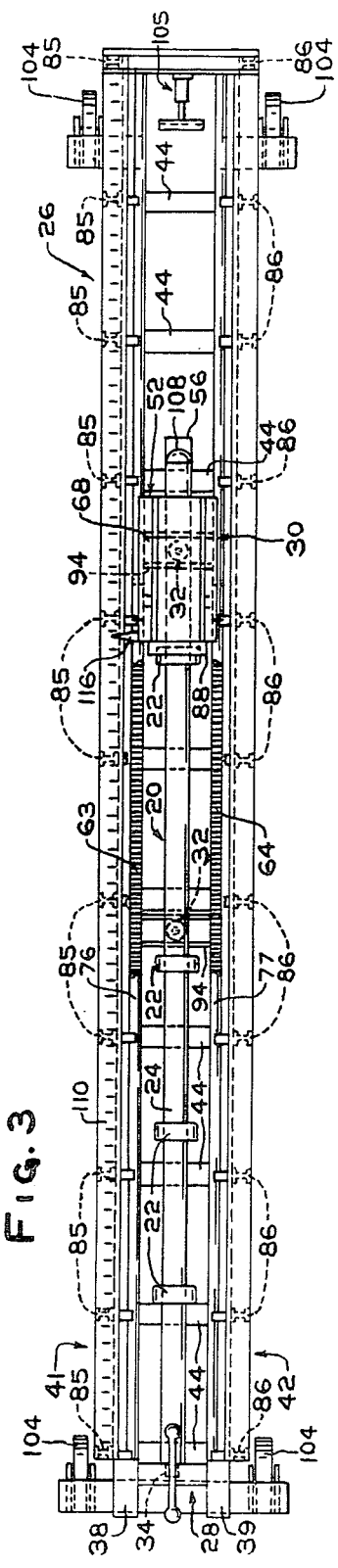
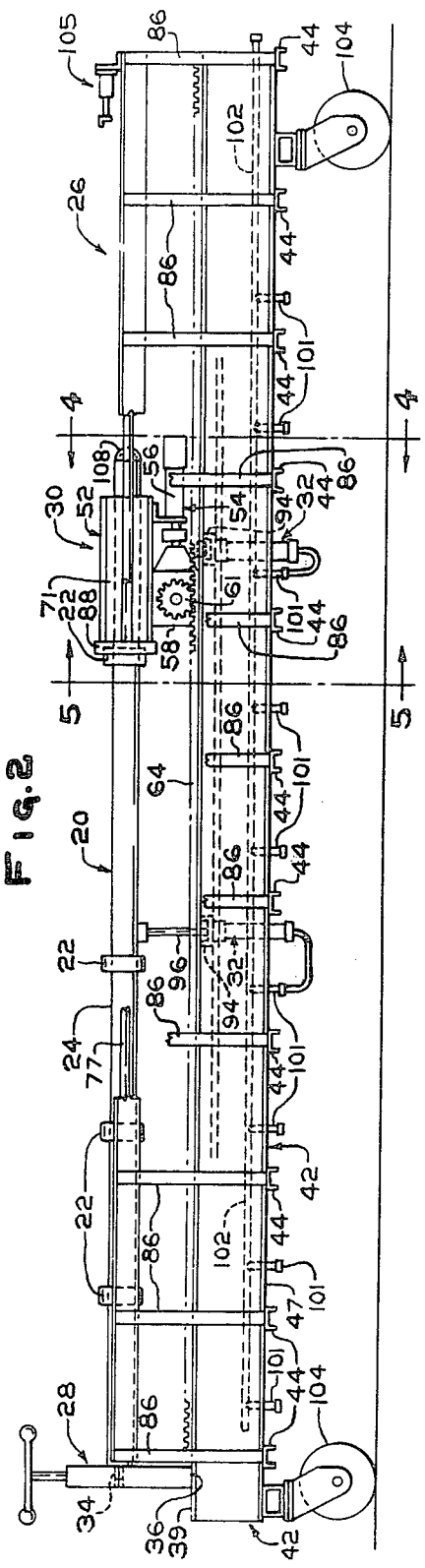

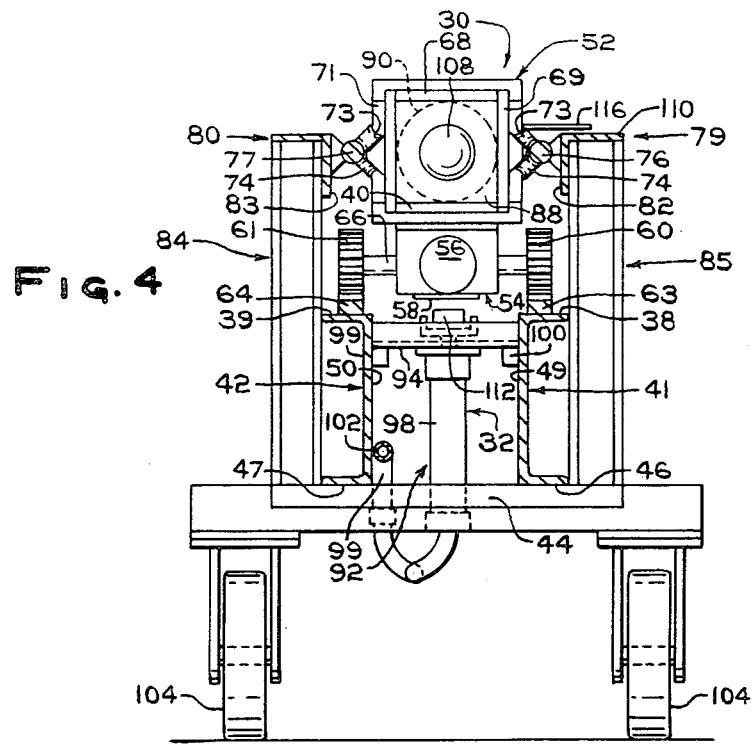
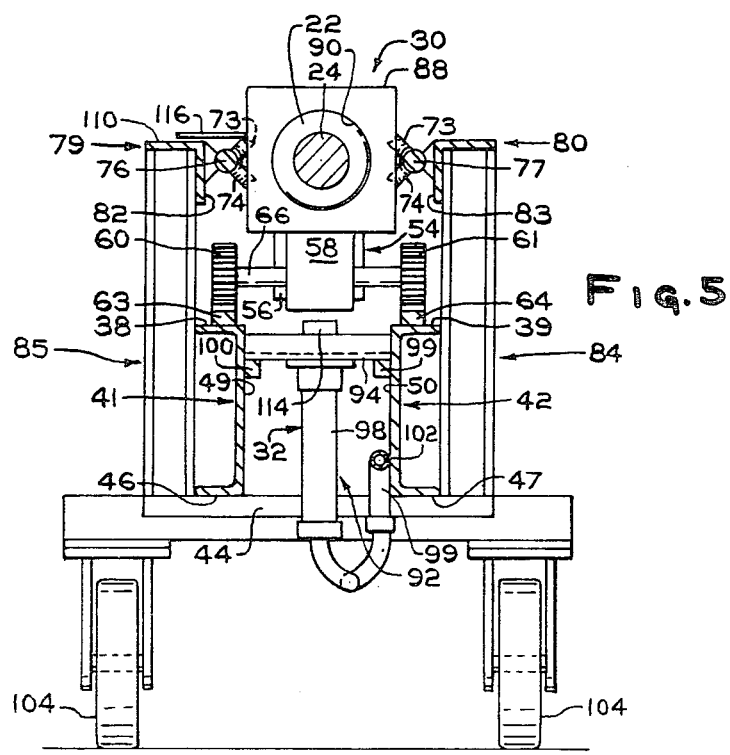

APPARATUS FOR INSTALLING ROLLS ON A CONVEYOR SHAFT

This is a division of application Ser. No. 22,906, filed Mar. 22, 1979 now U.S. Pat. No. 4,279,071 issued July 21, 1981.

BACKGROUND OF THE INVENTION

1. Field of the Invention

This invention relates to an apparatus for installing rolls on a shaft.

2. Discussion of the Technical Problems and Prior Art

Rollers for conveying sheets, e.g., glass sheets or a glass ribbon include a rigid shaft having a plurality of spaced resilient, flexible, rubber or urethane rolls or O rings often referred to as donut rolls mounted thereon. The rolls are periodically replaced because of (1) wear which reduces the roll diameter and/or (2) cuts and chips resulting from the leading edge of the glass sheets or ribbon running into the rolls. At the present time, worn rolls are removed by cutting through the rolls and new rolls installed on the shaft by hammering the rolls along the shaft into position. The rolls are frictionally held in position by providing the shaft with an outside diameter greater than the inside diameter of the rolls.

The technique of hammering rolls into position is not acceptable because it is time consuming and requires care to properly mount the rolls on the shaft. More particularly, if the plane through which the rolls rotate is not normal to the axial center of the shaft, the moving glass sheet or ribbon shifts toward a side of the conveyor. If the rolls are not properly spaced on the shaft, the glass sheet or ribbon will not be properly supported which could induce cracks in the glass. Although the prior art teaches techniques for mounting articles on members, these techniques are not acceptable for mounting rolls on shafts where the inside diameter of the rolls is smaller than the ouside diameter of the shaft.

U.S. Pat. Nos. 2,008,772; 2,218,904; 3,369,286; 3,611,536 3,665,578; 3,686,741; 3,812,562; 3,827,124 and 3,879,252 each, in general, teach a method of mounting a flexible ring or sleeve on an elongated member, e.g., a shaft by expanding the ring to mount same on the shaft. The expansion may be accomplished by forcing the sleeve onto a mandrel having a tapered surface; by heating the sleeve or expanding the sleeve using air. Although the above techniques are acceptable for their intended purpose they are not readily adaptable for mounting donut rolls on a shaft. This is because the donut rolls are too thick and made of urethane which is not readily expandable to facilitate mounting the rolls on the shaft. In addition some shafts have lengths of up to about 180 inches (4.5 meters) and to maintain the donut rolls in the expanded condition while moving same over the shaft is not feasible. Further, applying sufficient pressure to expand the inside surface of the roll may damage the roll reducing the required friction to secure the rolls in position. When this occurs the roll is not driven by the shaft but slips and will not advance the glass sheet or glass ribbon.

U.S. Pat. No. 3,426,119 teaches a technique for mounting a heat shrinkable sleeve on a shaft. This technique is not acceptable because the donut rolls employed for conveying the sheets are not heat shrinkable as required to practice the technique of the above-mentioned patent.

U.S. Pat. No. 2,658,269 teaches the mounting of rubber bushings on a sway bar by clamping the sway bar and forcing the bushing along the bar using a piston and cylinder arrangement. This technique is not acceptable for mounting donut rolls on shafts because the thickness of the donut rolls and the difference between the inside diameter of the donut roll and outside diameter of the shaft requires a force of such magnitude that is is not easily provided by a piston and cylinder arrangement. Further, using a piston and cylinder arrangement would require an unusually long one e.g., a piston and cylinder arrangement having a extended length of 360 inches (9 meters) for mounting rolls on a shaft 180 inches (4.5 meters) long.

Although the above prior art techniques for mounting O rings, sleeves, and/or bushings on shafts are acceptable for their intended purpose, they are not adaptable for mounting donut rolls on shafts for the reasons discussed above. Therefore, it would be advantageous to provide an apparatus for mounting donut rolls on a shaft that does not have the limitations of the prior art.

SUMMARY OF THE INVENTION

This invention relates to an apparatus for mounting rings on a shaft to provide a conveyor roll. The apparatus includes a carriage having a recess for containing a ring and facilities for driving the carriage over the shaft to individually and sequentially position the rings at selected positions on the shaft. The driving facilities include an air motor rotating a pair of gear wheels to move same along a geared linear track. With this arrangement movement of the carriage is accurately controlled while maintaining the axial center of the donut rolls coincident with the axial center of the shaft.

This invention also relates to a method of mounting rings on a shaft by mounting the shaft against movement in a first direction along a movement path while supporting the shaft in the moment path by engaging selected portions of the shaft. A ring is biased along the shaft in the first direction with the axial center of the roll coincident with the axial center of the shaft to position the roll at a preselected position on the shaft. As the ring approaches an engaged selected shaft position the shaft is disengaged.

The conveyor roll constructed in accordance to the invention has rolls accurately positioned on the shaft and the axial center of each coincident with one another. The result is a conveyor roll that applies properly spaced support to the glass to eliminate cracks and to eliminate uncontrolled sideward movement of the glass.

BRIEF DESCRIPTION OF THE DRAWING

FIG. 1 is a side view of a shaft having donut rolls mounted thereon in accordance to the teachings of the invention;

FIG. 2 is a side elevated view having portions removed for purposes of clarity of an apparatus incorporating features of the invention for installing donut rolls on a shaft;

FIG. 3 is a plan view of the apparatus shown in FIG. 2;

FIG. 4 is a view taken along lines 4—4 of FIG. 2; and

FIG. 5 is a view taken along lines 5—5 of FIG. 2.

DETAILED DESCRIPTION OF THE INVENTION

In FIG. 1 there is shown conveyor roller 20 having a plurality of spaced donut rolls 22 mounted on a shaft 24 in accordance to the teachings of the invention. As will be appreciated, the invention is not limited to the size of the shaft 24, size of the rolls 22, or the number of and spacing between the rolls 22. The rolls 22 are frictionally secured on the shaft 24 by providing a shaft 24 with a larger outside diameter than the inside diameter of the rolls 22. For example, donut rolls made of urethane and having an inside diameter of about 1.812 inches (4.602 centimeters); an outside diameter of about 6.000 inches (15.240 centimeters); and a width of about 1.500 inches (3.810 centimeters) as measured between the major surfaces are mounted on a steel shaft 24 having an outside diameter of about 1.9375 inches (4.9213 centimeters). Donut rolls made of urethane and having an inside diameter of about 4.875 inches (12.383 centimeters) an outside diameter of about 6000 inches (15.24 centimeters); and a width of about 1.000 inch (2.540 centimeters) are mounted on a steel shaft having an outside diameter of about 5.000 inches (12.700 centimeters).

Shown in FIGS. 2 and 3 is donut installation apparatus 26 having features of the instant invention for moving donut rolls 22 along the shaft 24 into a predetermined position. The apparatus 26 includes a shaft end holder 28, a donut roll moving carriage 30 and shaft supports 32. The shaft end holder 28 engages an end of the shaft 24, e.g., shaft end 34 to prevent shaft displacement as the carriage 30 moves a donut roll 22 along the shaft 24 in a manner to be discussed below. The construction of the shaft end holer 28 is not limiting to the invention and any convenient shaft end holder e.g., a pipe vise may be used. The shaft end holder 28 is conveniently secured in position by mounting e.g. by welding the bottom side 36 of the holder 28 (see FIG. 2) to upper surface 38 and 39 a pair of spaced rigid members 41 and 42, respectively. The rigid members 41 and 42 are not limiting to the invention but should be structurally stable to e.g. to provide support for the carriage 30 in a manner to be discussed below and for shaft end holder 28. For example, the members 41 and 42 may be C-shaped steel channels e.g. each about 10 inches (2.54 centimeters) and 18 feet (5.4 meters) long held in spaced relationship to one another by spaced rigid members 44. The members 44 may be C-shaped channels e.g. channels of about 3 inches (7.62 centimeters) high having a length of about 20.265 inches (0.524 meters) and welded to bottom surface 46 and 47 of the member 41 and 42, respectively, on a center-to-center spacing of about 24 inches (0.508 meters) to maintain inner surface 49 and 50 of the members 41 and 42 respectively spaced about 8.875 inches (22.543 centimeters) apart (see FIGS. 4 and 5).

The carriage 30 for moving individual donut rolls 22 along the shaft 24 includes a housing 52 for supporting a donut roll 22 and a driving mechanism 54 for moving the carriage 30. The driving mechanism 54 employed to move the carriage 30 is not limiting to the invention, however, the one selected should have sufficient power to move the donut roll over the shaft by applying a controlled force against the donut roll so that the axial center of the donut roll is coincident with the axial center of the shaft. One type of drive mechanism that may be used in the practice of the invention is an air motor 56 of the type sold by Ingersoll-Rand Model No. 4840 Q. The motor 56 is connected to journal box 58 to drive gears therein (not shown) which in turn drive gear wheels 60 and 61 in track 63 and 64, respectively by way of shaft 66. The tracks 63 and 64 are conveniently mounted on the upper surface 38 and 39 of members 41 and 42, respectively, as shown in FIGS. 4 and 5. The wheels 60 and 61 and their respective track 63 and 64 provide a rack and pinion arrangement that continually moves and maintains the donut rolls biased toward the preselected position i.e. biased toward the shaft end holder 28.

The sizing of the gear wheels 60 and 61 and their respective track 63 and 64 is not limiting to the invention. Gear wheels 60 and 61 having a pitch diameter of about 3.00 inches (7.62 centimeters); a width of about 1.25 inches (3.175 centimeters); and 24 teeth, moving on gear racks having a width of about 1.25 inches (3.175 centimeters) and a pitch of 8 have been satisfactorily used in the practice of the invention.

The housing 52 is conveniently secured to the journal box 58 to move the housing over the shaft 24, i.e., along a reciprocating linear path toward and away from the shaft end holder 28. Although not limiting to the invention, the housing includes joined steel plates 68–71 (see FIG. 4). Upper wheel 73 and lower wheel 74 rotatably mounted on housing plates 69 and 71 ride along rail 76 and 77 respectively to maintain alignment of housing 52 for reasons discussed below.

Although not limiting to the invention the rails 76 and 77 are mounted on rigid support 79 and 80, respectively, e.g., on inner surface 82 and 83 of angle irons 79 and 80 respectively. The angle irons 79 and 80, e.g., 3.5 inches (8.89 centimeters) by 3.5 inches (8.89 centimeters) angle irons are secured in position by vertical struts 85 and 86, respectively, e.g., 3 inch (7.62 centimeters) C-shaped channel members having one end secured to the rigid members 41 and 42 and the other end secured to the angle irons 79 and 80, respectively.

A face plate 88 having a holed recess 90 for supporting a donut roll 22 is advantageously mounted on the plates 68–71. Preferably the face plate 88 is removable to accommodate different size donut rolls to be mounted on the shaft. To minimize binding of the donut rolls on the shaft as the donut is moved along the shaft by the carriage, it is recommended that the axial center of the recess 90 in the face plate and axial center of the shaft mounted in the shaft end holder 28 be coincident to one another by aligning the face plate with the shaft end holder 28. The axial center of the mounted shaft, the guideway 76 and 77, and wheels 73 and 74 should be parallel to the shaft to assist in maintaining the axial center of the roll and shaft coincident with one another. In this way, the rotating donut rolls will not displace the sheets or bias a glass ribbon toward a side of the conveyor as they advance along their path.

To facilitate mounting of the shaft end 34 in the shaft end holder 28, and to maintain alignment of the shaft the use of shaft supports 32 are recommended. With reference to FIGS. 2–5, and specific reference to FIGS. 4 and 5, the shaft supports 32 include double action piston and cylinder assembly 92 mounted on plate 94 having a hole (not shown) such that the piston 96 (shown in FIG. 2) as it moves out of the cylinder 98 moves upward through the plate to support the shaft 24. The plate 94 is supported by ledge members 99 and 100 mounted on surface 50 and 49 of members 42 and 41 respectively. Air for the assembly 92 is provided by outlets 101 of line 102 mountable to air supply, e.g., plant air line (not shown).

The apparatus 26 may be made portable by mounting wheels 104 to the bottom surface 46 and 47 of the rigid members 41 and 42, respectively, in any convenient manner. Donut rolls 22 are mounted on the shaft in the following manner. The apparatus is moved into position adjacent a conveyor section (not shown) having damaged donut rolls. The air line 102 and air motor 56 are conveniently connected to the plant air supply (not shown). The motor 56 is energized to move the carriage 30 to the right of the apparatus as viewed in FIGS. 2 and 3. A shock absorber 105 is provided to assist in decelerating the carriage 30. Plates 94 of the shaft supports 32 are mounted on the ledge members 99 and 100 on a center-to-center spacing of about 8 inches (20.32 centimeters) and connected to adjacent outlet 101 of the air line 102. The pistons 97 are extended and retracts into the cylinder to allow the carriage 50 to move past the cylinder in any convenient manner e.g. using air logic devices of the type sold by Miller Fluid Power Corp. A shaft having worn donuts is placed on the pistons of the shaft supports and has its end 34 secured in the shaft end holder 28. A bullet-shaped end cap 108 is mounted on the free end of the shaft to facilitate moving a donut roll onto the shaft body. The position of all worn donut rolls are noted on scale 110 mounted on member 79 and the worn donut rolls removed from the shaft in any convenient manner, e.g., by cutting. A donut roll is mounted in the recess 90 of the fore plate 88 and the motor 56 energized to move the donut roll over the end cap 108 and along the shaft. As the carriage approaches a shaft support, the carriage energizes the air logic switch 112 (see FIG. 4) mounted on the plate 94 to move air into the cylinder to drop the piston. When the trailing edge of the carriage 30 when moving from right to left as viewed in FIG. 2 moves past air logic switch 114 (see FIG. 5) air moves into the cylinder to raise the piston. When the donut roll is in position as indicated by the pointer 116 the carriage is moved in an opposite direction, i.e., to the right as viewed in FIGS. 2 and 3. As the carriage 30 moves toward a shaft support the air logic switch 114 is engaged to lower the piston. After the carriage moves past switch 112 the piston is raised. When the face plate clears the radiused end 108, a donut is mounted in the recess and the above repeated to position new donuts on the rolls. After the donut rolls are mounted on the shaft, the shaft is removed.

As can be appreciated, the above example is presented for illustration purposes only and is not limiting to the invention.

What is claimed is:

1. A method of mounting rings made of resilient, flexible material on a rigid shaft wherein outside diameter of the shaft is at least equal to inside diameter of the rings, comprising the steps of:

mounting the shaft against movement in a predetermined direction along a path generally parallel to the longitudinal axis of the shaft;

supporting the shaft in the path by engaging the shaft at selected positions intermediate to its ends;

moving a ring over the shaft;

disengaging the shaft at the selected positions as the ring moves toward the selected positions;

engaging the shaft at the selected positions as the ring passes the selected positions;

positioning the ring in a preselected position on the shaft; and repeat the above steps to mount additional rings on the shaft.

* * * * *